Figure 1:
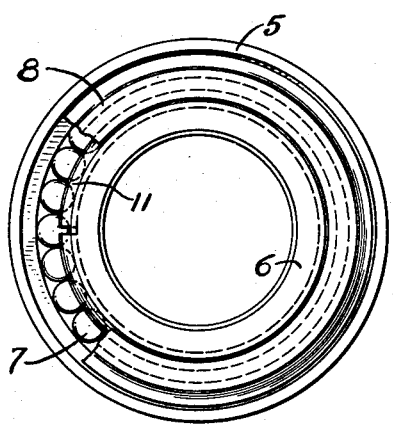

Aug. 15, 1944.  H. L. POTTER  2,355,818
BEARING
Filed Sept. 11, 1940

INVENTOR
HOWELL L. POTTER
BY
ATTORNEYS.

Patented Aug. 15, 1944

2,355,818

UNITED STATES PATENT OFFICE

2,355,818

BEARING

Howell L. Potter, New Britain, Conn., assignor to The Fafnir Bearing Company, New Britain, Conn., a corporation of Connecticut Application September 11, 1940, Serial No. 356,258

2 Claims. (Cl. 308—213)

My invention relates to a bearing, particularly of the needle roller type. Such bearings, as is well known, are not adapted to take end thrust, even sufficient to hold the bearing in unit holding relationship.

It is the principal object of my invention to provide improved means for holding a roller type bearing in unit handling relationship.

It is another object to provide improved means for holding a roller bearing in unit handling relationship and which will permit ready disassembly of the bearing for inspection, greasing, etc.

Other objects and various features of novelty and invention will be hereinafter pointed out or will become apparent to those skilled in the art.

In the drawing which shows, for illustrative purposes only, a preferred form of the invention—

Figure 2:
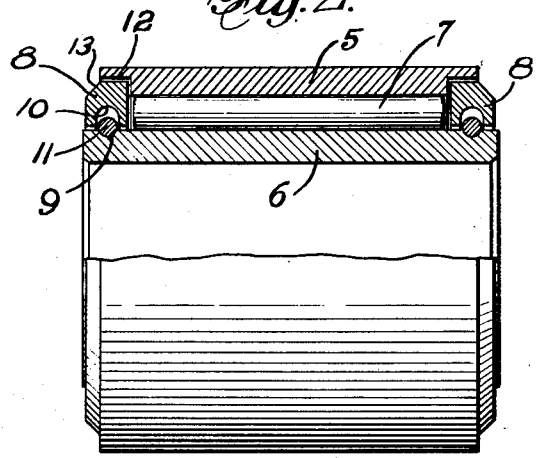

Fig. 1 is an end view, with a part broken away, of a needle bearing, illustrating features of the invention; and Fig. 2 is a side view in quarter section of the bearing illustrated in Fig. 1.

The bearing illustrated is a needle roller bearing and includes an outer bearing ring 5, inner bearing ring 6, with interposed needle rollers 7. Such bearings, it will be plain, are capable of taking no substantial end thrust nor thrust even sufficient in most cases to hold the bearing in unit handling relationship.

My invention relates particularly to means for holding the bearing assembled so that it may be handled as a unit and even take slight end thrusts in operation.

In the particular form illustrated I employ what may be termed an end cap 8 at each end of the bearing. These end caps are detachably secured to one of the rings (in this case the inner ring). In the preferred form the inner ring is provided with a circumferentially extending groove 9 and each end cap 8 is provided with a circumferentially extending groove 10 facing the groove 9. A snap ring 11 fits in the groove 9 and extends into the groove 10 so as to hold the end cap in place on the inner ring. The snap ring 11 is shown as round in section and the groove 9 is of a depth to embrace less than half the diameter of the ring. In the form shown the outer ring is counterbored at each end, as indicated at 12, and the outer edge of the end cap 8 extends into the counterbore. The end cap may be chamfered or rounded off, as indicated at 13, so as to avoid sharp projections and provide a bearing of finished appearance.

The fit, form and proportioning of the parts are such that axial pressure between the end cap and the inner ring will cause the snap ring to cam itself out of one of the grooves and thus permit ready separation of the bearing parts. In the particular form illustrated, wherein the groove 9 is quite shallow and the snap ring 11 of round section, the sides of the shallow groove constitute camming surfaces for camming the ring out of the groove 9 upon the relative axial pressure referred to. It will be plain that the ring need not be of round section, and camming surfaces of different forms could be provided.

The end cap 8 is preferably a relatively loose fit about the inner ring, so that manufacturing tolerances need not be close and yet the end caps serve as reasonably effective seals to retain lubricant in and exclude foreign matter from the bearing and at the same time to hold the bearing in unit handling relationship with the necessary degree of security. However, should it become necessary to separate the parts of the bearing for any purpose, axial pressure between the end cap and the inner ring will serve to separate the parts.

While the invention has been described in considerable detail and a preferred form illustrated, it is to be understood that various changes may be made within the scope of the invention as defined in the appended claims.

I claim:

1. A roller-type bearing including inner and outer bearing rings with interposed bearing rollers, an end cap extending across the space between said inner and outer rings, one of said rings and said end cap each having a groove, said grooves facing each other, and a snap ring fitting within both said grooves and serving to hold said end cap removably on said ring having said groove, said snap ring at the side fitting in one of said grooves being of cam shaped form and said last mentioned groove having a cam shaped surface to engage the cam shaped side of said snap ring to cam the snap ring into the other of said grooves upon the exertion of opposite endwise pressure on said rings having said grooves and permit endwise separation of said end cap from its ring.

2. A roller-type bearing including inner and outer bearing rings with interposed bearing rollers, an end cap extending across the space between said inner and outer rings, one of said rings and said end cap each having a groove, said grooves facing each other, and a snap ring fitting within both said grooves and serving to hold said end cap removably on said ring having said groove, said snap ring being of round cross section and the groove in one of said rings being of a depth to receive less than half the diameter of the snap ring, whereby upon endwise pressure on said end cap said snap ring will be cammed out of said one of said grooves and said end cap may be removed from its ring.

HOWELL L. POTTER.